(12) United States Patent
Feuer et al.

(10) Patent No.: US 6,751,372 B2
(45) Date of Patent: Jun. 15, 2004

(54) FOUR-PORT WAVELENGTH-SELECTIVE CROSSBAR SWITCHES (4WCS) USING RECIPROCAL WDM MUX-DEMUX AND OPTICAL CIRCULATOR COMBINATION

(75) Inventors: Mark D. Feuer, Colts Neck, NJ (US); Nicholas J. Frigo, Red Bank, NJ (US); Cedric F. Lam, Middletown, NH (US)

(73) Assignee: AT&T Corp, New York, NY (US)

( * ) Notice: Subject to any disclaimer, the term of this patent is extended or adjusted under 35 U.S.C. 154(b) by 128 days.

(21) Appl. No.: 10/026,837

(22) Filed: Dec. 27, 2001

(65) Prior Publication Data

US 2002/0131689 A1 Sep. 19, 2002

Related U.S. Application Data

(60) Provisional application No. 60/276,485, filed on Mar. 19, 2001.

(51) Int. Cl.$^7$ ................................................. G02R 6/28
(52) U.S. Cl. ........................... 385/24; 385/25; 385/37; 398/83
(58) Field of Search ........................... 385/24, 25, 37; 398/43, 83, 84

(56) References Cited

U.S. PATENT DOCUMENTS

| 5,446,809 | A | | 8/1995 | Fritz et al. |
|---|---|---|---|---|
| 5,559,624 | A | | 9/1996 | Darcie et al. |
| 5,940,197 | A | | 8/1999 | Ryu |
| 5,940,551 | A | | 8/1999 | Oberg |
| 5,943,155 | A | | 8/1999 | Goossen |
| 5,974,207 | A | * | 10/1999 | Aksyuk et al. ............. 385/24 |
| 6,067,389 | A | | 5/2000 | Fatehi et al. |
| 6,091,869 | A | | 7/2000 | Sundelin |
| 6,122,095 | A | | 9/2000 | Fatehi |
| 6,130,765 | A | | 10/2000 | Gautheron et al. |
| 6,175,432 | B1 | | 1/2001 | Wu et al. |
| 6,181,849 | B1 | | 1/2001 | Lin et al. |
| 6,195,187 | B1 | | 2/2001 | Soref et al. |
| 6,201,909 | B1 | | 3/2001 | Kewitsch et al. |
| 6,205,267 | B1 | | 3/2001 | Aksyuk et al. |
| 6,211,980 | B1 | | 4/2001 | Terahara |
| 6,212,314 | B1 | | 4/2001 | Ford |
| 6,263,127 | B1 | * | 7/2001 | Dragone et al. ............. 385/24 |
| 6,275,329 | B1 | | 8/2001 | Sieben |
| 6,288,810 | B1 | | 9/2001 | Grasso et al. |
| 6,289,145 | B1 | | 9/2001 | Solgaard et al. |
| 6,295,397 | B1 | | 9/2001 | Augustsson |
| 2002/0044729 | A1 | * | 4/2002 | Hung ........................ 385/24 |
| 2002/0131684 | A1 | * | 9/2002 | Doarr ........................ 385/24 |

FOREIGN PATENT DOCUMENTS

| EP | 0 743 711 | 11/1996 |
|---|---|---|
| WO | WO 00/76103 | 12/2000 |

OTHER PUBLICATIONS

Riza N A et al: "Versatile Multi–Wavelength Fiber–Optic Switch and Attenuator Structures Using Mirror Manipulations" Optics Communications, North–Holland Publishing Co. Amsterdam, NL, vol. 169, No. 1–6, Oct. 1, 1999, pp. 233–244.

European Search Report EP 02 00 2894.

* cited by examiner

Primary Examiner—Akm Enayet Ullah
Assistant Examiner—Sun Pak

(57) ABSTRACT

A four-port wavelength-selective crossbar switch generates an add/drop wavelength signal from a wave division multiplexed (WDM) signal using a plurality of double-sided reflectors that selectively reflects a selected wavelength channel signal of the WDM signal through optical circulators to provide low crosstalk between the dropped and added wavelength signals. The switch also reduces the number of WDM MUX-DEMUX required to one half that compared to a traditional approach. Furthermore, the switch can be designed to be wavelength cyclic with individual free spectral ranges that can be independently set to either through or add/drop states.

6 Claims, 4 Drawing Sheets

FOUR-PORT WAVELENGTH-SELECTIVE CROSSBAR SWITCHES (4WCS) USING RECIPROCAL WDM MUX-DEMUX AND OPTICAL CIRCULATOR COMBINATION

BACKGROUND OF THE INVENTION

This application claims priority to provisional U.S. Application Ser. No. 60/276,485, entitled "Four-Port Wavelength-Selective Crossbar Switches (4WCS) Using Reciprocal WDMs and Optical Circulator Combination," invented by Mark D. Feuer et al., filed Mar. 19, 2001, and is incorporated by reference herein. Additionally, the present application is related to provisional U.S. Patent Application Serial No. 60/276,495, entitled "Delivering Multicast Services On A Wavelength Division Multiplexed Network Using a Configurable Four-Port Wavelength Crossbar Switch" invented by Mark D. Feuer et al., filed Mar. 19, 2001, and to U.S. Patent Application Serial No. (Atty Docket IDS 2000-502), entitled "Delivering Multicast Services On A Wavelength Division Multiplexed Network Using a Configurable Four-Port Wavelength Selective Crossbar Switch," invented by Mark D. Feuer et al., filed concurrently with the present application, and each of which is incorporated by reference herein.

1. Field of the Invention

The invention relates to wavelength division multiplexed (WDM) signals. More particularly, the present invention relates to a crossbar-type switch for generating an added and dropped wavelength signals having low crosstalk between the dropped and added wavelength signals.

2. Description of the Related Art

FIG. 1 shows a functional block diagram of a conventional four-port wavelength-selective crossbar switch (4WCS) 100. Input wavelengths $\lambda_1, \lambda_2, \ldots, \lambda_N$ are demultiplexed first by a wavelength demultiplexer 101, which can be formed by, for example, cascaded thin film filters, fiber Bragg gratings, or arrayed waveguide gratings. The demultiplexed signals are connected through an array of 2×2 crossbar switches 105 to a multiplexer 103 prior to the drop port or an output multiplexer 104. Crossbar switches 105 also connect the wavelengths corresponding to the dropped wavelengths from the add port to output multiplexer 104. The wavelengths that are to be added/dropped are selected by controlling the respective states of the crossbar switches.

A critical problem with a conventional 4WCS, such as shown in FIG. 1, is the potential for optical crosstalk in the 2×2 crossbar switches 105, thereby causing an unwanted portion of the dropped signal to coherently interfere with an added signal. The present invention provides a different implementation of a 4WCS switch and still having the functionality shown in FIG. 1.

Consequently, what is needed is a technique for adding/dropping optical signals from a WDM signal that effectively eliminates optical crosstalk between dropped and added optical signals.

BRIEF SUMMARY OF THE INVENTION

The present invention provides a technique for adding/dropping optical signals from a WDM signal that effectively eliminates optical crosstalk between dropped and added optical signals. The advantages of the present invention are provided by an optical four-port wavelength-selective crossbar switch having a reciprocal wavelength division multiplexer-demultiplexer (WDM MUX-DEMUX) and an optical circulator at the input side, another reciprocal WDM MUX-DEMUX and another optical circulator at the output side, and at least one removable double-sided reflector there between. A WDM demultiplexer separates a wavelength division multiplexed (WDM) signal having a plurality of wavelengths into a plurality of individual wavelength channel signals. A WDM multiplexer combines a plurality of individual wavelength channel signals into a WDM signal having a plurality of wavelengths. Light travels reversibly in a reciprocal WDM MUX-DEMUX. In other words, a reciprocal WDM MUX-DEMUX functions as a WDM multiplexer when individual wavelength channel signals are input from one side and as a demultiplexer when a WDM signal is input from the other side. Each wavelength channel signal corresponds to at least one wavelength of the WDM signal. According to one aspect of the invention, one wavelength channel signal may include a plurality of wavelengths separated by a predetermined free spectral range (FSR) and appears as a comb in the optical spectrum. A reciprocal WDM MUX-DEMUX can be, for example, a waveguide grating router. An optical circulator is a non-reciprocal element including a first port, a second port and a third port. Light input from the first port is coupled to the second port and light input from the second port is coupled into the third port in a circular fashion. The input circulator receives the WDM signal through the first port and couples the WDM signal to the input end reciprocal WDM MUX-DEMUX through the second port. A drop signal that is received through the second port of the input optical circulator is output from the third port (drop port) of the input optical circulator. The output optical circulator receives the output WDM signal from the output end reciprocal WDM MUX-DEMUX through the second port and outputs the output WDM signal through the third port. An add signal that is coupled to the first port (add port) is output from the second port of the output optical circulator to the output end reciprocal WDM MUX-DEMUX. Each double-sided reflector is disposed in a path of a selected wavelength channel signal between the optical demultiplexer and the optical multiplexer, and is selectably operated so that in a first mode of operation a first side of the double-sided reflector reflects a selected wavelength channel signal corresponding to the wavelength channel signal path in which the double-sided reflector is disposed back to the second port of the input optical circulator. A second side of the doubled-sided reflector in the first mode of operation reflects an add signal having at least one wavelength corresponding to the wavelength channel signal path in which the double-sided reflector is disposed back to the second port of the output optical circulator. The selected reflected wavelength channel signal can be modulated with, for example, multicast data (as described in the provisional U.S. Patent Application Serial No. 60/276,495, entitled "Delivering Multicast Services on a Wavelength Division Multiplexed Network Using a Configurable Four-Port Wavelength Crossbar Switch), and coupled to the add port of the output optical circulator. In a second mode of operation, each double-sided reflector allows the selected wavelength channel signal corresponding to the wavelength channel signal path in which the double-sided reflector is disposed to pass from the optical demultiplexer to the optical multiplexer. In one embodiment of the present invention, at least one double-sided reflector is a micro-electro-mechanical-system (MEMS) mirror. In an alternative embodiment of the invention, the double-sided reflector is a mechanical anti-reflection switch (MARS). In yet another alternative embodiment, the double-sided reflector is a reflective thin-film interference filter. In a further embodiment, a series of reflective thin-film interference filters corresponding to different FSRs are used in place of the double-sided reflective mirrors. This embodiment allows wavelengths corresponding to different FSRs in each wavelength channel signal to be independently set to the bar (through) or cross (add/drop) state.

The present invention also reduces the number of WDM MUX-DEMUXs required to achieve the same function by a factor of two compared with the conventional approach.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a configurable four-port wavelength-selective optical crossbar switch (4WCS) that is capable of dropping any subset of input wavelengths from the input port to a drop port. The same wavelengths dropped at the drop port can be added from an add port to the output port.

Figure 1:
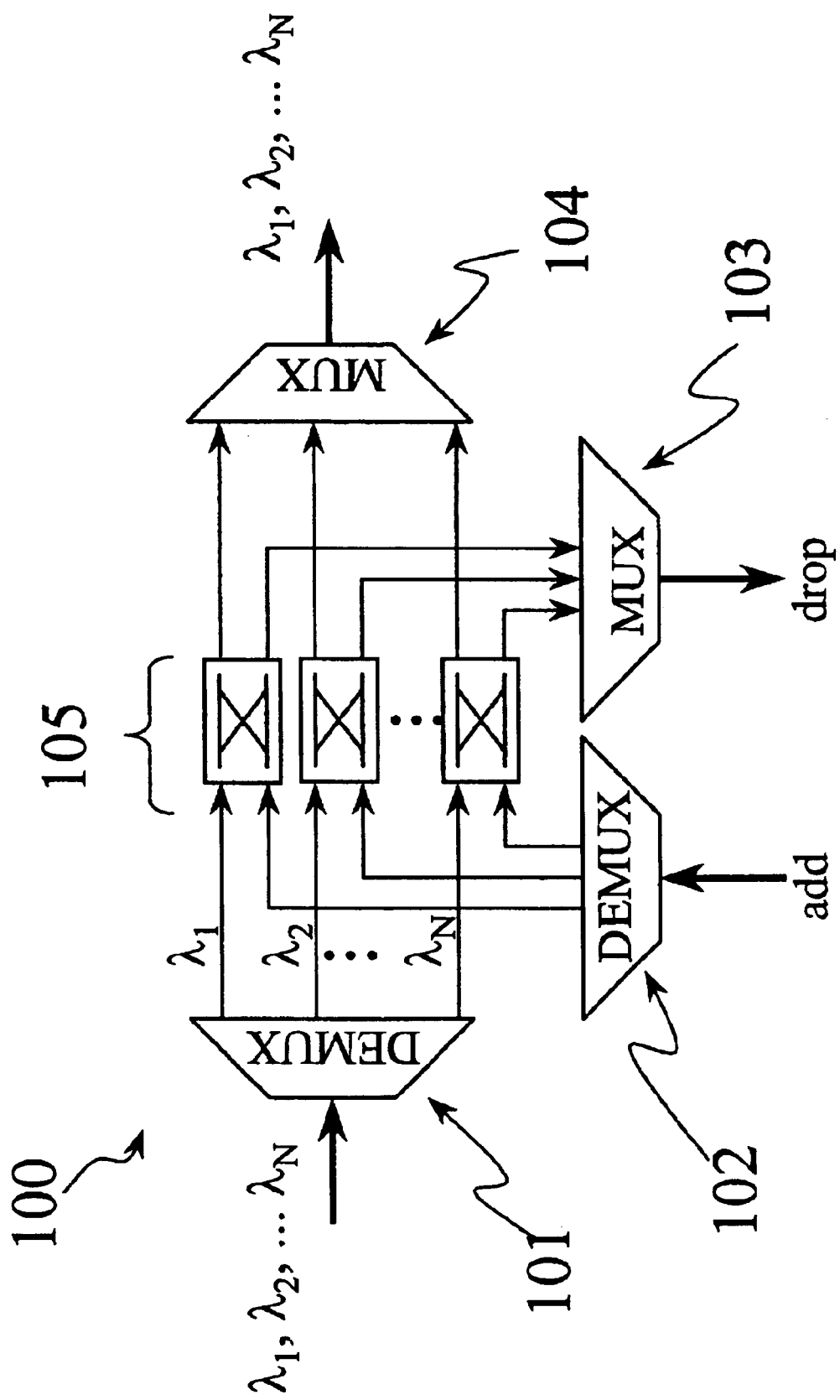
FIG. 1 shows a functional block diagram of a conventional four-port wavelength-selective crossbar switch (4WCS)
Figure 2:
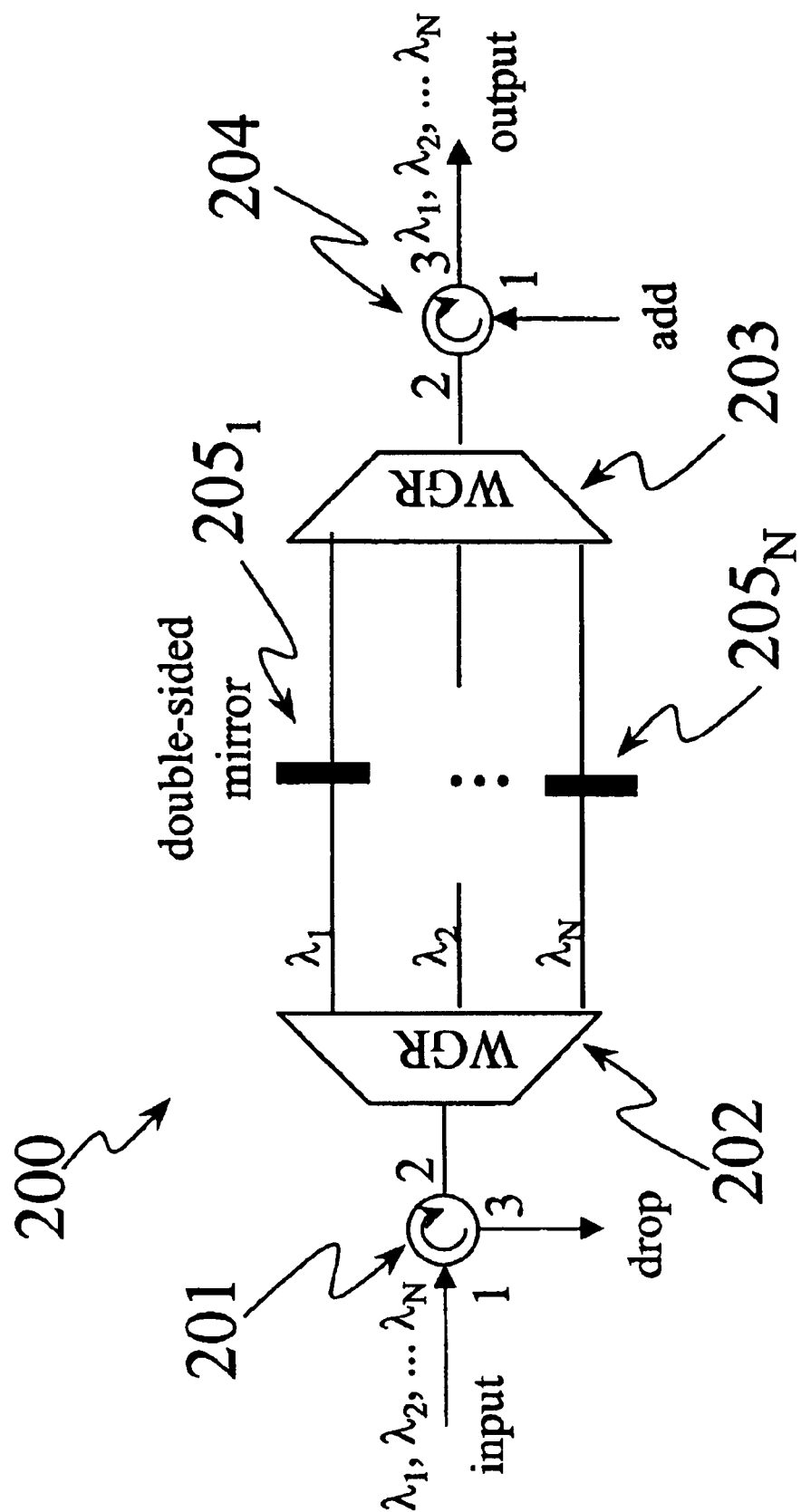
FIG. 2 shows a functional block diagram of a four-port wavelength-selective crossbar switch (4WCS) according to the present invention.

FIG. 2 shows a functional block diagram of a four-port wavelength-selective crossbar switch (4WCS) 200 according to the present invention. Switch 200 includes an input optical circulator 201, an input bi-directional wavelength demultiplexer 202 (which is the input end reciprocal WDM MUX-DEMUX), a bi-directional wavelength multiplexer 203 (which is the output end reciprocal WDM MUX-DEMUX), and an output optical circulator 204. Input optical circulator 201 includes a "drop" port, and output optical circulator 204 includes an "add" port. Input demultiplexer 202 and output multiplexer 203 can each be a waveguide grating router (WGR) that separates the different wavelengths of a WDM signal into different channels, or arms, in a well-known manner. Optical circulators 201 and 204 separate the in-coming and outgoing waves, as described in detail below, and reduce the total number of WGR ports and devices to half in comparison to a conventional 4WCS, such as shown in FIG. 1. As opposed to the conventional approach, switch 200 operates in a unidirectional manner and is not reversible for bi-directional traffic within a single fiber.

Switch 200 also includes a plurality of removable, double-sided optical reflectors $205_1$–$205_N$ that are each respectively positioned so that an optical reflector can be inserted into a wavelength channel, or arm, between input demultiplexer 202 and output multiplexer 203. Each reflector 205 provides extremely high isolation between an added and a dropped channel because the reflectivity and the optical thickness of an optical reflector 205 are preferably large. While the embodiment of the present invention shown in FIG. 2 includes a reflector 205 for each wavelength channel, it should be understood that some wavelength channels might not include a reflector 205. Accordingly, wavelengths in those channels can only go through switch 200 without being added or dropped.

Reflectors 205 can use any design that is capable of switching from two-sided back-reflection to a full-transmitting state or mode of operation, that is, an "IN" state and an "OUT" state, respectively. Reflectors 205 can use, for example, micro-electro-mechanical-system (MEMS) technology for selectably inserting or removing a two-sided mirror from an optical beam in a well-known manner. Moreover, because both WGR devices and MEMS devices are fabricated on silicon substrates, WGR devices 202 and 203, and removable reflectors 205 for an entire 4WCS switch according to the present invention can be fabricated on a single silicon chip.

WGR devices 202 and 203 provide reciprocal operation, so when a reflector 205 is in the "IN" state, the wavelength corresponding to the reflector is reflected back to a WGR device (input demultiplexer 202 and output multiplexer 203), thereby causing a wavelength in a particular arm to be added/dropped. When a reflector 205 is in the "OUT" state, the wavelength corresponding to the reflector is set to the through state, or the express state, and the beam thereby passes through the corresponding arm. For example, when reflector $205_1$ is set to the "IN" state, input wavelength $\lambda_1$ of an input WDM signal is reflected back through input demultiplexer 202 to input circulator 201. (For this portion of the wavelength $\lambda_1$ signal path, input demultiplexer 202 operates as a multiplexer.) Reflected wavelength $\lambda_1$ travels clockwise around optical circulator 201 and is output from the drop port. Dropped wavelength $\lambda_1$ can be modulated with, for example, downstream data from another network node for the local node. Wavelength $\lambda_1$ can then be added back to the WDM signal through the add port of output optical circulator 204. Wavelength $\lambda_1$ travels clockwise around output optical circulator 204 and is output from circulator 204 in a direction toward multiplexer 203 (which, for this portion of the signal path of wavelength $\lambda_1$, operates as a demultiplexer). Wavelength $\lambda_1$ is reflected by reflector $205_1$ back to output multiplexer 203 and is added back to the WDM signal. The added wavelength $\lambda_1$ can be modulated with, for example, upstream data from the local node to the next network node.

There are many ways of implementing reflectors 205. For example, reflectors 205 can be made similar to MEMS reflectors that are used in an optical MEMS cross-switch. That is, MEMS reflectors 205 can be flipped in a vertical or horizontal position, corresponding to the IN and OUT states of reflectors 205. Alternatively, rather than physically moving a reflector out of a beam, a reflector may be altered internally so that the reflector becomes non-reflective at the wavelength of interest. Examples of this approach could include a mechanical anti-reflection switch (MARS) or devices that are based on a frustrated total internal reflection.

Additional system capabilities are provided when an input demultiplexer and an output multiplexer are wavelength-cyclic, that is, have a filter response function that repeats over a period of wavelengths, which is called the free spectral range (FSR). A wavelength cyclic property can be designed into a waveguide grating router, Mach-Zehnder interferometers, Fabry-Perot filters etc., to provide a particular FSR. For example, when a WGR is wavelength cyclic, the output from port i will include wavelength and all wavelengths $\lambda_i+m\times\Lambda$, where m is an integer and $\Lambda$ is the free spectral range. Accordingly, a single filter element can provide wavelength routing for many distinct wavelength channels. One important network application might be to use different FSRs for delivering different services and to further separate the different services at each node of an optical network using coarse optical filters.

Figure 3:
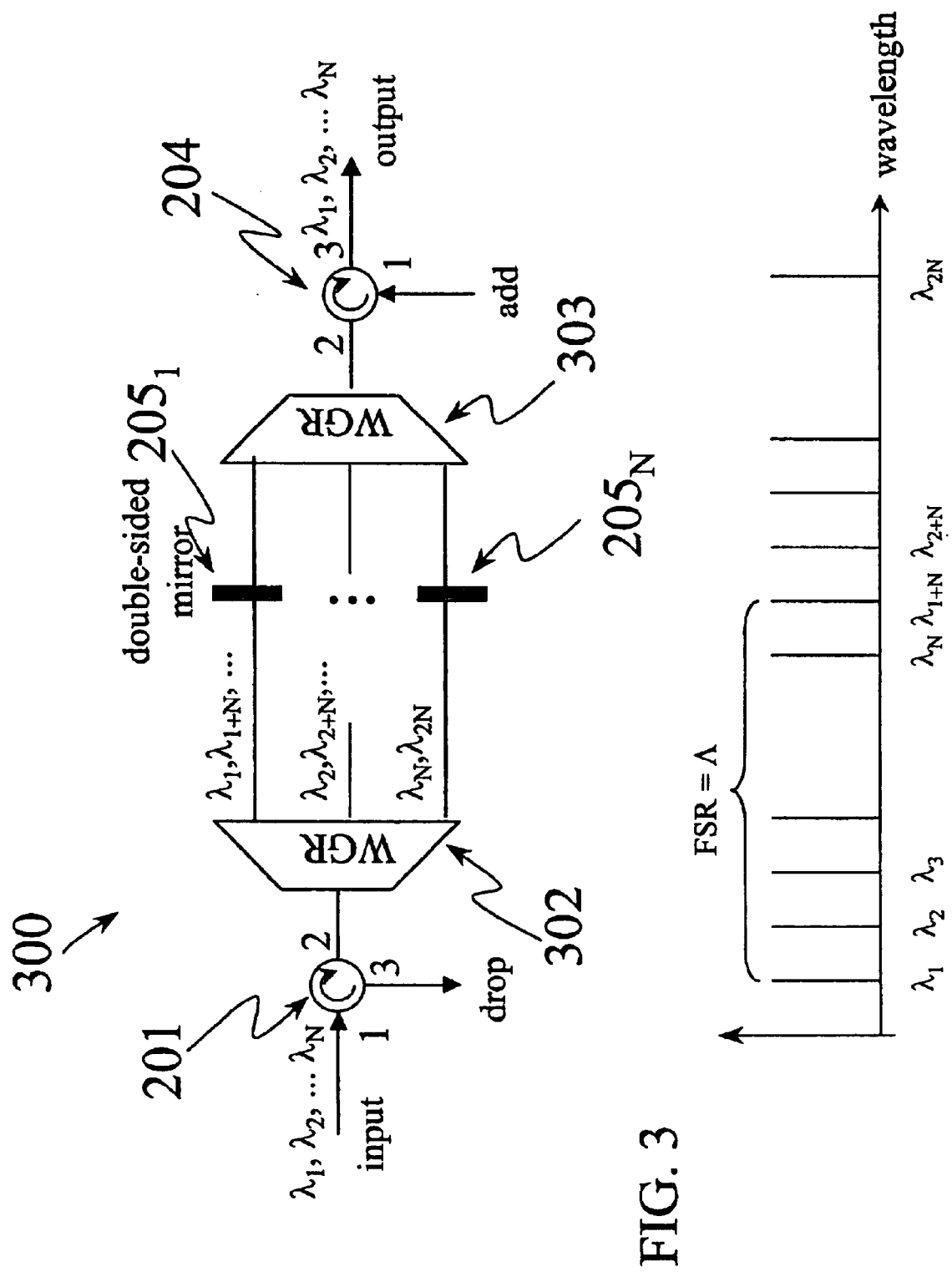
FIG. 3 shows a functional block diagram of a four-port wavelength-selective crossbar switch (4WCS) according to the present invention having a free spectral range.

FIG. 3 shows a functional block diagram of a four-port wavelength-selective crossbar switch (4WCS) 300 according to the present invention having a free spectral range (FSR). Switch 300 includes an input demultiplexer 302 and/or an output multiplexer 303 that provide an FSR. The bottom of FIG. 3 illustrates the optical spectrum of the input WDM signal and the FSR of the WDM MUX-DEMUX.

Figure 4:
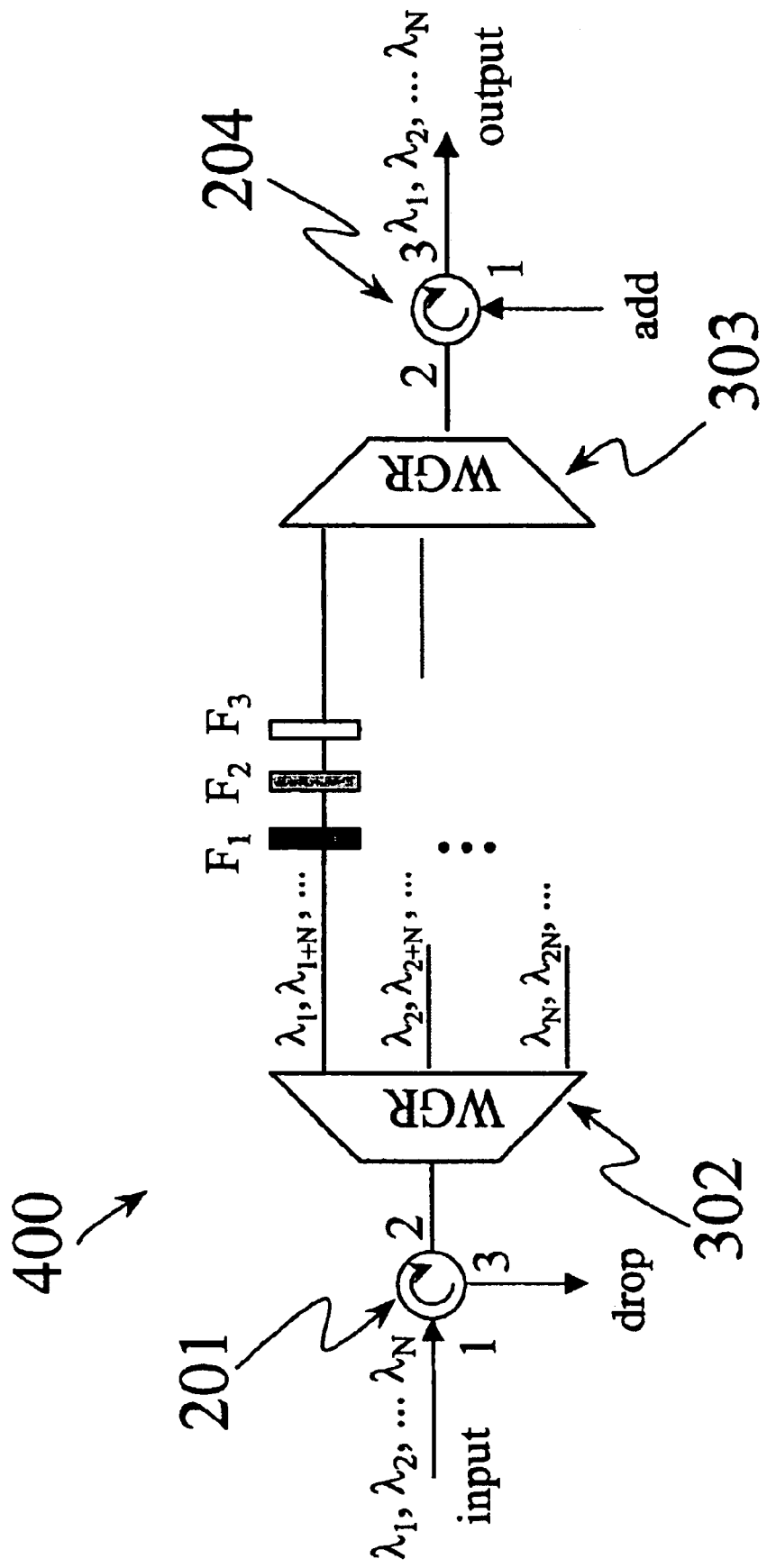
FIG. 4 shows a functional block diagram of a four-port wavelength-selective crossbar switch (4WCS) 400 according to the present invention that provides even more flexibility than other embodiments of the present invention without increasing the number of WGR ports.

FIG. 4 shows a functional block diagram of a four-port wavelength-selective crossbar switch (4WCS) 400 according to the present invention that provides even more flexibility than other embodiments of the present invention without increasing the number of WGR ports. Instead of including all-wavelength reflectors between the input demultiplexer and the output multiplexer, such as shown in FIG. 2, each reflector can be replaced with a series of reflective filters F, such as thin-film interference filters. For example, in FIG. 4, $F_1$, $F_2$ and $F_3$ represent filters that reflect three independent FSRs and let other optical signals pass. Similar to a double-sided mirror, each filter can be independently set to the IN or OUT position. Consequently, each wavelength in every free spectral range can be independently added/dropped or passed through, extending the functionality and flexibility of the 4WCS.

The advantage of added/dropped isolation of the alternative embodiment of FIG. 4 is obtained at the expense of potential self-homodyne interference. The self-homodyne interference is due to imperfect filter reflectivities and scattering at the multiple filter surfaces. This complicated effect is not-related to the claims in the current invention and will not be further described here.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An optical four-port wavelength-selective crossbar switch, comprising:
   an optical demultiplexer separating a wavelength division multiplexed (WDM) signal having a plurality of wavelengths into a plurality of wavelength channel signals, each wavelength channel signal corresponding to at least one wavelength of the WDM signal;
   an optical multiplexer receiving a wavelength channel signal corresponding to each wavelength of the separated WDM signal and forming an output WDM signal;
   an input optical circulator having a first port, a second port and a third (drop) port, the input optical circulator receiving the WDM signal through the first port and coupling the WDM signal to the optical demultiplexer through the second port, a drop signal being received through the second port of the input optical circulator being output from the drop port of the input optical circulator;
   an output optical circulator having a first (add) port, a second port and a third port, the output optical circulator receiving the output WDM signal from the optical multiplexer through the second port and outputting the output WDM signal through the third port, an add signal coupled to the add (first) port being output from the second port of the output optical circulator; and
   at least one double-sided reflector being disposed in a path of a selected wavelength channel signal between the optical demultiplexer and the optical multiplexer, each double-sided reflector being selectably operated so that in a first mode of operation a first side of the double-sided reflector reflects a selected wavelength channel signal corresponding to the wavelength channel signal path in which the double-sided reflector is disposed back to the second port of the input optical circulator, and so that a second side of the doubled-sided reflector reflects an add signal having at least one wavelength corresponding to the wavelength channel signal path in which the double-sided reflector is disposed back to the second port of the output optical circulator and in a second mode of operation allowing the selected wavelength channel signal corresponding to the wavelength channel signal path in which the double-sided reflector is disposed to pass from the optical demultiplexer to the optical multiplexer, wherein at least one of the optical demultiplexer and the optical multiplexer is wavelength-cyclic.

2. The switch according to claim 1, wherein the optical demultiplexer, optical multiplexer and each double-sided reflector is fabricated on a silicon substrate.

3. The switch according to claim 1, wherein at least one wavelength channel signal includes a plurality of wavelengths within a predetermined free spectral range (FSR).

4. The switch according to claim 1, wherein at least one double-sided reflector is a mechanical anti-reflection switch (MARS).

5. The switch according to claim 1, wherein at least one double-sided reflector is a reflective thin-film interference filter.

6. The switch according to claim 5, wherein the double-sided reflector is a series of reflective thin-film interference filters, each of which corresponds to a different free spectral range (FSR) of the wavelength cyclic multiplexer and demultiplexer and each of filter can be set in either IN or OUT state.

* * * * *